United States Patent [19]

Lin et al.

[11] Patent Number: 5,787,635
[45] Date of Patent: Aug. 4, 1998

[54] FISHING HOOK STORAGE APPARATUS

[76] Inventors: Chun Shiong Lin; Jefferson Lin; Philip Lin; Thomas Lin; Ziu Eng Xu. all of 7809 Carter, Dr. #7, Overland Park, Kans. 66204

[21] Appl. No.: 601,331

[22] Filed: Feb. 16, 1996

[51] Int. Cl.⁶ .................................................. A01K 97/06
[52] U.S. Cl. ............................................................ 43/57.1
[58] Field of Search ............................... 7/106; 269/907; 43/1, 54.1, 57.1; 206/315.11; 30/125, 289, 294

[56] References Cited

U.S. PATENT DOCUMENTS

| | | | |
|---|---|---|---|
| 2,051,136 | 8/1936 | Dormire | 206/315.11 |
| 2,076,157 | 4/1937 | Perkins | 43/57.1 |
| 2,657,497 | 11/1953 | Beaver | 43/57.1 |
| 2,682,126 | 6/1954 | Shepherd | 43/1 |
| 2,717,470 | 9/1955 | Holdeman | 43/57.1 |
| 2,729,913 | 1/1956 | Holwerda | 43/57.1 |
| 2,826,853 | 3/1958 | Guy | 43/57.1 |
| 3,057,464 | 10/1962 | Baggott | 206/315.11 |
| 3,122,452 | 2/1964 | Oakes | 43/57.1 |
| 3,224,134 | 12/1965 | Holcombe | 43/57.1 |
| 4,942,691 | 7/1990 | Hwang | 43/57.1 |

*Primary Examiner*—Kurt Rowan
*Attorney, Agent, or Firm*—Harrison & Egbert

[57] ABSTRACT

An apparatus for securing a fishing hook for the purpose of allowing the threading of a fishing line into an eyelet of a fishing hook including a container body having an interior volume suitable for receiving fishing hooks therein, a lid detachably connected to the container body for sealing an interior of the container body, and a fishing hook securing member attached to the lid for detachably receiving a hook portion of a fishing hook therein such that the eyelet portion of the fishing hook extends outwardly of the container body. A magnet is affixed within an interior of the lid. The fishing hook securing member includes a bolt member extending outwardly of the lid and a nut member threadedly connected to the bolt member. The fishing hook is secured between the nut member and a surface of the lid. The nut member includes a wingnut detachably secured to the bolt member and having arms extending radially outwardly of a central portion. At least one of the arms has a fishing line cutter formed thereon.

15 Claims, 2 Drawing Sheets

5,787,635

FISHING HOOK STORAGE APPARATUS

TECHNICAL FIELD

The present invention relates to containers and devices for storing fishing hooks. More particularly, the present invention relates to such storage devices which include apparatus for securing a fishing hook for the purpose of threading a fishing line through an eyelet of the fishing hook. Furthermore, the present invention relates to apparatus for facilitating the threading the fishing hook eyelet.

BACKGROUND ART

Fishing is a favorite activity of many persons around the world. Whenever fishing occurs, it will be necessary for the fisherman to use a fishing line and a fishing hook. Conventionally, the fishing line will be attached to a fishing pole so that the fisherman can fish off of a dock, a shore, or other location. Normally, the fishing line is secured to the fishing hook by threading the fishing line through an eyelet of the fishing hook. The fishing hook includes a hook portion at one end, a shank portion extending from the hook portion, and an eyelet formed on the end of the shank portion opposite the hook portion.

Unfortunately, it is often difficult to attach a fishing hook to the fishing line without occasionally stabbing one's fingers with the hook portion of the fishing hook. Under normal circumstances, the fisherman will remove a fishing hook from a storage container and manipulate the fishing hook with his or her fingers so that the line can be attached through the eyelet. The complex manipulations required so as to properly thread fishing line through the eyelet of the fishing hook will often cause the stabbing action to occur.

There are various apparatus and fishing hooks which can facilitate the threading of the eyelet of the fishing hook without resulting in stabbing. Unfortunately, these devices are separate and apart from the storage container. As a result, the fisherman will often ignore such devices since it would require a further search so as to locate the apparatus after the fishing hook has been removed from the storage container.

It is an object of the present invention to provide a storage container for fishing hooks.

It is another object of the present invention to provide a storage container for fishing hooks which includes a means for facilitating the threading of the eyelet of the fishing hook with the fishing line.

It is another object of the present invention to provide an apparatus which avoids accidental stabbing by the fishing hook.

It is another object of the present invention to provide an apparatus that can cut the fishing line after the threading of the eyelet occurs.

It is still another object of the present invention to provide an apparatus that can position the fishing hook for easy removal from the storage container.

It is still another object of the present invention to provide an apparatus which is easy to use, relatively inexpensive, and easy to manufacture.

These and other objects and advantages of the present invention will become apparent from a reading of the attached specification and appended claims.

SUMMARY OF THE INVENTION

The present invention is an apparatus which comprises a container body having an interior volume suitable for receiving fishing hooks therein, a closure means detachably connected to the container body for sealing an interior of the container body, and a fishing hook securing means attached to the closure means for detachably receiving a hook portion of a fishing hook therein such that an eyelet portion of the fishing hook extends outwardly of the container body.

The container body has a cylindrical configuration with a closed end opposite the closure means. The closure means is a lid which is detachably affixed to the top of the container body. A magnet is affixed within an interior of the lid so as to face downwardly toward the container body such that the magnet can magnetically attract at least one of the fishing hooks thereto.

The fish hook securing means includes a bolt member extending outwardly of the lid and a nut member threadedly secured to the bolt member. The fishing hook is secured between the nut member and a surface of the lid such that the eyelet of the fishing hook extends outwardly of the lid and of the container body. The nut member is specifically a wingnut which is threadedly secured to the bolt member. The wingnut has arms extending radially outwardly of a central portion. The central portion is secured to the bolt member. At least one of the arms has a fishing line cutter formed thereon. The fishing line cutter allows the fisherman to cut a length of fishing line as desired. In one embodiment of the present invention, at least one of the arms has a flange portion extending outwardly therefrom. The fishing line cutter is a V-shaped indentation formed on this flange portion.

The fishing hook securing means of the present invention also includes a washer member extending around the bolt member. The washer member is interposed between the nut member and the surface of the lid. The surface of the lid has a washer surface affixed thereto around the bolt member. The washer surface has a generally greater diameter than the washer member. The washer member and the washer surface serve to receive the hook portion of a fishing hook therebetween. The washer member is affixed to the nut member such that a rotation of the nut member around the bolt member causes a vertical movement of the washer member.

DETAILED DESCRIPTION OF THE INVENTION

Figure 1:
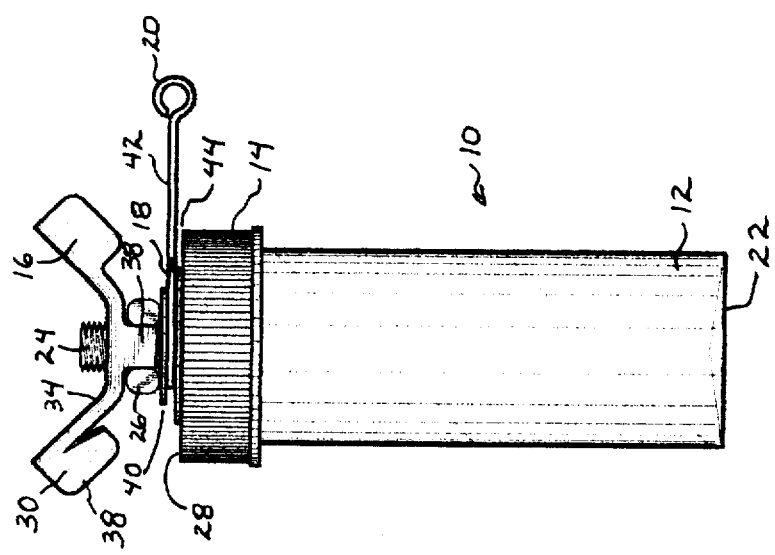
FIG. 1 is a side elevational view of the apparatus in accordance with the preferred embodiment of the present invention.

Referring to FIG. 1, there is shown at 10 the apparatus in accordance with the preferred embodiment of the present invention. The apparatus 10 includes a container body 12, a closure member 14, and a fish hooking securing member 16. The closure member 14 is a lid which is detachably connected to the container body 12. The fish hooking securing member 16 is attached to the closure member 14 so as to detachably receive a hook portion of a fishing hook 18 therein such that an eyelet portion 20 of the fishing hook 18 extends outwardly of the container body 12.

As can be seen in FIG. 1, the container body 12 has a generally cylindrical configuration. The container body 12 includes a closed end 22 opposite the end of the cylindrical body 12 having the closure member 14 attached thereto. The interior of the container body 12 will have a size suitable for receiving a large number of fishing hooks therein. The container body 12 can be made of an opaque or a transparent material, such as plastic. The container body 12 should have a size suitable for easy storage and transport.

The fishing hook securing member 16 includes a bolt member 24 extending outwardly of the lid 14. A nut member 26 is threadedly secured to the bolt member 24. As can be seen, the fishing hook 18 is secured between the nut member 26 and a top surface 28 of the lid 14.

Specifically, in the present invention, the nut member 26 is a wingnut 30 which is threadedly secured to the bolt member 24. This wingnut 30 includes arms 32 and 34 extending outwardly of a central portion 36. The central portion 36 is secured to the bolt member 24. At least one of the arms 32 and 34 has a fishing line cutter 36 formed thereon. The fishing line cutter 36 is suitable for cutting a fishing line therein. As can be seen, the fishing line cutter 36 is a V-shaped indentation formed in a flange portion 38 extending outwardly from the arm 34. The flange portion 38 extends angularly downwardly from the arm 34 of the wingnut 30. The V-shaped indentation 36 is positioned generally adjacent to the arm 34 so that the fishing line cutter 36 is in a suitable position for cutting the fishing line without risk of injury to the fisherman using the apparatus 10.

As can be seen, in FIG. 1, a washer member 40 extends around the bolt member 24. The washer member 40 is interposed between the nut member 26 and the front surface 28 of the lid 14. As can be seen, the hook portion of the fishing hook 18 is interposed between the washer member 40 and the top surface 28 of the lid 14. The tightening of the wingnut 30 serves to apply pressure from the nut 26 to the surface of the washer 40 so that the fishing hook 18 is rigidly secured in this position. The eyelet 20 of the fishing hook 18 extends outwardly of the lid 14 and the container body 12 so that it is in an easy position for the threading of a fishing line therethrough. The dangerous hook portion of the fishing hook 18 is retained between the washer member 40 and the top surface 28 of the lid 14 so that it is in a safe position. Ideally, the lid 14 and the washer member 40 will have a diameter which is greater than the distance between the hook of the fishing hook 18 and the shank portion 42 of the fishing hook 18.

In FIG. 1, it can be seen that a washer surface 44 is affixed to the top surface 28 of the lid 14. This washer surface 44 can be a washer which extends around the bolt member 24. The washer surface 44 will have a diameter generally greater than the diameter of the washer member 40. The washer surface 44 is designed so as to protect the top surface 28 of the lid 14 from damage by the hook of the fishing hook 18. As can be seen in FIG. 1, the fishing hook 18 is interposed between the washer member 40 and the washer surface 44.

In operation, the nut member 26 is rotated about the bolt member 24 so that a space is formed between the washer member 40 and the washer surface 44 of the lid 14. The lid 14 is removed from the top of the container body 12. A fishing hook 18 can then be removed from the interior of the container body 12. The hook portion of the fishing hook 18 is then placed around the bolt member 24 in the space between the washer member 40 and the washer surface 44. The wingnut 30 can then be rotated such that the nut member 26 is moved downwardly on the bolt member 24 so as to compressively engage the hook portion of the fishing hook 18 between the washer member 40 and the washer surface 44. The eyelet 20 will then be in a proper position extending outwardly of the container body 12.

Figure 2:
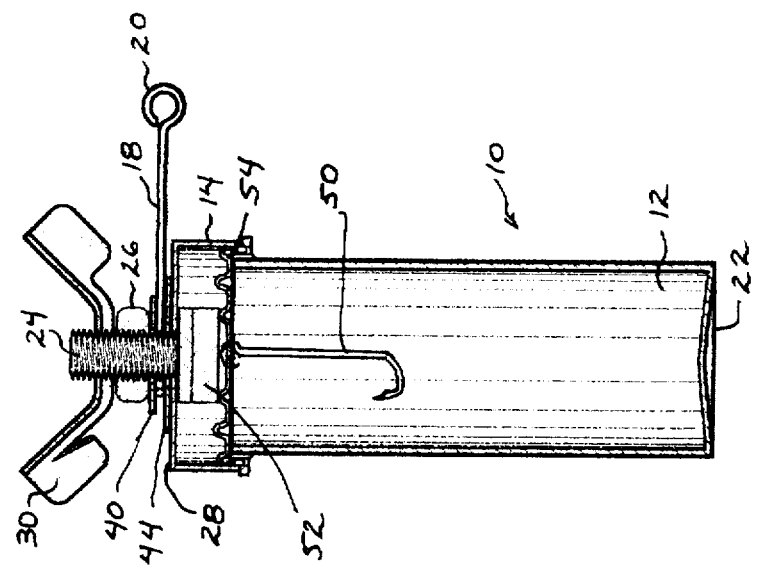
FIG. 2 is a cross-sectional view of the apparatus of the present invention.

FIG. 2 is a cross-sectional view of the apparatus 10 of the present invention. As can be seen in FIG. 2, a fishing hook 50 is received within the interior of the container body 12. Importantly, the lid 14 includes a magnet 52 centrally positioned on an interior of the lid 14. The magnet 52 can be adhesively positioned on the interior of the lid 14 or otherwise attached on the interior of the lid 14. A sealing portion 54 is located on the interior of the lid 14 so as to retain the magnet 52 in position and to allow for a proper sealing of the container body 12. The magnet 52 faces downwardly toward the bottom 22 of the container body 12. When it is desired to remove a fishing hook 50, the container body 12 can be gently shaken so that the magnet 52 will magnetically attract a fishing hook 50 thereto. When the lid 14 is removed from the top of the container body 12, a fishing hook 50 will appear attached to the magnetic surface 52 on the interior of the lid 14. As a result, the fishing hook 50 can be easily retrieved by the fisherman without placing his or her fingers into the interior of the container body 12. As a result, the magnetic lifting of the fishing hook 50 from the interior of the container body 12 will facilitate the removal of a fishing hook 50 without the danger of stabbing.

As can be seen in FIG. 2, the bolt member 24 extends continuously upwardly from the top surface 28 of the lid 14. The nut member 26 is threadedly received by the threads of the bolt member 24 and serves to support the wingnut 30 on the bolt member 24. The washer member 40 can be affixed to a bottom surface of the nut member 26 so that a rotation of the nut member 26 will cause a corresponding vertical movement of the washer member 40. The washer surface 44 can be permanently attached to the top surface 28 of the lid 14 so that it is in a position to constantly protect the top surface 28.

Figure 3:
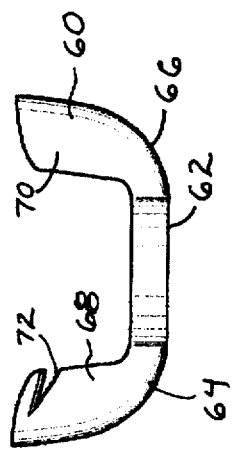
FIG. 3 is a side elevational view of an alternative embodiment of the wingnut used on the apparatus of the present invention.

FIG. 3 shows an alternative embodiment of the wingnut of the present invention. In this alternative embodiment, it can be seen that a wingnut 60 has a central portion 62 for attachment to the bolt member 24. Arms 64 and 66 extend outwardly of the central portion 62. Flange portions 68 and 70 extend outwardly of the arms 64 and 66, respectively. A fishing line cutter 72 is formed in the flange portion 68 so as to allow for the cutting of a fishing line. The fishing line cutter 72 is a V-shaped indentation formed so as to face inwardly of the wingnut 60. This configuration of wingnut 60 can be used in place of the wingnut 30, as shown in FIGS. 1 and 2.

In FIG. 3, it can be seen that the line cutter 72 is formed on the flange portion 68 at a location removed from the upper end 73 of flange portion 68. As such, the line cutter 72 is in a proper position so as to avoid injury to the users of the line cutter 72. Importantly, in FIG. 3, it can be seen that the washer 75 is affixed to the bottom surface of the central portion 62. In the present invention, the wingnut 60 and the washer 75 can be formed as one piece.

Figure 4:
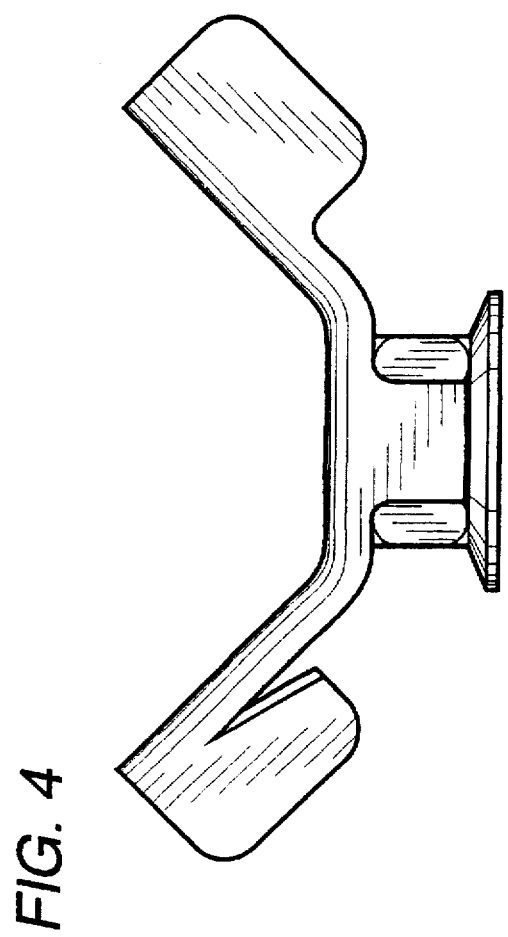
FIG. 4 is a side elevational view of an alternate embodiment of the wingnut.

In FIG. 4, there is shown an alternative embodiment 80 of the wingnut 82 of the present invention. The wingnut 82 has a configuration similar to the wingnut 16 of the embodiment 10 shown in FIG. 1. Importantly, in this embodiment of the invention, a nut member 84 is permanently affixed to the wingnut 82 so that there is no separation between the wingnut 82 and the nut member 84. As such, a single wingnut can be used, instead of the multiple pieces provided for in FIG. 1.

The present invention is very convenient for use by fishermen. The container body 12 can contain a large number of fishing hooks so that the fisherman will always have access to fishing hooks. The size of the container body 12 is such that it can easily be carried in the pocket of the fisherman. Whenever the fisherman desires to remove a fishing hook, the lifting of the lid 14 will cause the fishing hook 50 to be magnetically attracted to the lid 14 so that a fishing hook can be easily removed from the interior of the container body without the fisherman using his or her fingers to retrieve such a hook from the interior of the container body. The fishing hook 50 can be easily removed from the magnet 52. After removal, the hook portion of the fishing hook 50 is fitted around the bolt member 24 so as to be received between the washer member 40 and the washer surface 44. When the nut member 26 is rotated downwardly, the hook portion is safety secured between the washer member 40 and the washer surface 44 so that stabbing injuries are not possible. The eyelet 20 of the fishing hook 18 is then in the proper position to receive the fishing line. If it is desired to cut the fishing line before of after threading the eyelet 20, then the V-shaped indentation 36 is available for convenient use by the fisherman. It is not necessary for the fisherman to retrieve a knife, or other object, for the purposes of cutting of the fishing line. After the eyelet has been properly threaded, the fishing hook 18 can be safely removed by loosening the nut member 26 so that the washer member 40 separates from the washer surface 44. As a result, the present invention effectively prevents stab injuries from occurring.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. An apparatus comprising:
    a container body having an interior volume suitable for receiving fishing hooks therein;
    a closure means detachably connected to said container body, said closure means for sealing an interior of said container body; and
    a fishing hook securing means attached to said closure means, said fishing hook securing means for detachably receiving a hook portion of a fishing hook therein such that an eyelet portion of the fishing hook extends outwardly of said container body, said fishing hook securing means comprising:
        a bolt member extending outwardly of said closure means; and
        a nut member threadedly secured to said bolt member, the fishing hook being secured between said nut member and a surface of said closure means, said nut member comprising a wingnut threadedly secured to said bolt member, said wingnut having arms extending radially outwardly of a central portion, said central portion secured to said bolt member, at least one of said arms having a fishing line cutting means formed thereon, said fishing line cutting means for cutting a fishing line therein.

2. The apparatus of claim 1, said container body having a cylindrical configuration with a closed end opposite said closure means.

3. The apparatus of claim 1, said closure means comprising:
    a lid detachably affixed to a top of said container body.

4. The apparatus of claim 3, said closure means further comprising:
    a magnet affixed within an interior of said lid.

5. The apparatus of claim 4, said magnet positioned centrally within said interior of said lid, said magnet facing downwardly toward said container body such that said magnet can magnetically attract one of the fishing hooks thereto.

6. The apparatus of claim 1, at least one of said arms having a flange portion extending outwardly therefrom, said fishing line cutting means comprising:
    a V-shaped indentation formed in said flange portion.

7. The apparatus of claim 6, said flange portion extending angularly downwardly of the arm, said V-shaped indentation formed on an inner edge of said flange portion generally adjacent the arm.

8. The apparatus of claim 6, said flange portion extending upwardly of the arm, said V-shaped indentation formed along an inner surface of said flange portion.

9. The apparatus of claim 1, further comprising:
    a washer member extending around said bolt member, said washer member interposed between said nut member and said surface of said closure means.

10. The apparatus of claim 9, said closure means being a lid detachably affixed to said container body, said surface of said closure means being a top surface of said lid, said top surface of said lid having a washer surface affixed thereto around said bolt member.

11. The apparatus of claim 10, said washer surface having a generally greater diameter than said washer member, said washer member and said washer surface for receiving the hook portion of a fishing hook therebetween.

12. The apparatus of claim 9, said washer member being affixed to said nut member such that a rotation of said nut member around said bolt member causes a vertical movement of said washer means.

13. An apparatus comprising:
    a container body having an interior volume suitable for receiving fishing hooks therein;
    a lid detachably secured to said container body, said lid for closing an interior of said container body;
    a bolt member extending upwardly from said lid; and
    a nut means threadedly secured to said bolt member, said nut means for detachably secured a fishing hook against a surface of said lid;, said nut member comprising a wingnut threadedly secured to said bolt member, said wingnut having arms extending radially outwardly of a central portion, said central portion secured to said bolt member, at least one of said arms having a fishing line cutting means formed thereon, said fishing line cutting means for cutting a fishing line therein.

14. The apparatus of claim 13, said container body and said lid having a diameter less than a length of the fishing hook.

15. The apparatus of claim 13, further comprising:
    a magnet affixed within an interior of said lid, said magnet positioned centrally within said interior of said lid, said magnet facing downwardly toward said container body such that said magnet can magnetically attract one of the fishing hooks thereto.

* * * * *